(12) United States Patent
Ely

(10) Patent No.: US 12,196,711 B2
(45) Date of Patent: Jan. 14, 2025

(54) STRUCTURES INCLUDING A MEASUREMENT COATING AND METHODS OF FORMING THE SAME

(71) Applicant: National Technology & Engineering Solutions of Sandia, LLC, Albuquerque, NM (US)

(72) Inventor: George Ray Ely, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 200 days.

(21) Appl. No.: 17/323,148

(22) Filed: May 18, 2021

(65) Prior Publication Data

US 2021/0278374 A1 Sep. 9, 2021

Related U.S. Application Data

(62) Division of application No. 15/677,441, filed on Aug. 15, 2017, now Pat. No. 11,022,582.

(51) Int. Cl.
*G01N 29/04* (2006.01)
*G01N 25/20* (2006.01)

(52) U.S. Cl.
CPC ........... *G01N 29/043* (2013.01); *G01N 25/20* (2013.01); *G01N 29/045* (2013.01); *G01N 2291/0231* (2013.01)

(58) Field of Classification Search
CPC .... G01N 29/043; G01N 25/20; G01N 29/045; G01N 2291/0231; G01N 25/72
See application file for complete search history.

(56) References Cited

U.S. PATENT DOCUMENTS

| | | | | |
|---|---|---|---|---|
| 5,170,929 A | * | 12/1992 | Long | B23K 20/10 228/264 |
| 5,831,150 A | * | 11/1998 | Sowerby | G01N 15/02 73/61.75 |
| 6,066,573 A | | 5/2000 | Muroyama | |
| 2002/0081243 A1 | * | 6/2002 | He | C23C 24/08 422/177 |
| 2005/0186327 A1 | * | 8/2005 | Saito | G01N 25/72 427/8 |
| 2008/0038477 A1 | * | 2/2008 | Stewart | G01N 29/11 427/372.2 |
| 2012/0199843 A1 | | 8/2012 | Heikman et al. | |
| 2014/0184784 A1 | | 7/2014 | Yanase | |
| 2015/0285982 A1 | | 10/2015 | Coe-Sullivan et al. | |

* cited by examiner

*Primary Examiner* — Tarun Sinha
(74) *Attorney, Agent, or Firm* — Daniel J. Jenkins; Kenneth P. McNeill

(57) ABSTRACT

A structure includes a substrate and a coating applied over the substrate, the coating containing particles sized between 30 and 250 micrometers. A proportion of the particles to the carrier is between 40 and 70 by volume percentage. In response to excitation of the structure by a controllable excitation source, a first instrument monitors behavior of the particles to determine a first condition of the structure thereby. In response to an absence of excitation of the structure by the controllable excitation source, a second instrument monitors behavior of the particles to determine a second condition of the structure thereby.

38 Claims, 2 Drawing Sheets

STRUCTURES INCLUDING A MEASUREMENT COATING AND METHODS OF FORMING THE SAME

RELATED APPLICATIONS

This application is a divisional application of parent patent application U.S. application Ser. No. 15/677,441, filed Aug. 15, 2017, and titled "STRUCTURES INCLUDING A MEASUREMENT COATING AND METHODS OF FORMING THE SAME".

The present application claims the priority of its parent application, which is incorporated herein by reference.

GOVERNMENT INTEREST STATEMENT

The United States Government has rights in this invention pursuant to Contract No. DE-AC04-94AL85000 between the United States Department of Energy and Sandia Corporation, and Contract No. DE-NA0003525 between the United State Department of Energy and National Technology & Engineering Solutions of Sandia, LLC, both for the operation of the Sandia National Laboratories.

FIELD OF THE INVENTION

The present invention is directed to coated structures and methods of forming a measurement coating over structures.

BACKGROUND OF THE INVENTION

For purposes of safety, it is desirable to inspect infrastructure (e.g., buildings and bridges), airplane components, and components in other industries for cracks or structural flaws. One method of non-destructive testing involves the use of an ultrasonic horn that vibrates or excites the component by introducing sound energy which propagates through the component in the form of waves. The presence of a discontinuity, such as a crack in the wave path results in frictional heating generated by translation of the faying surfaces. Using an infrared camera to detect the frictional heating, information about the discontinuity's location, size, orientation and other features may be gained.

However, there are shortcomings associated with such testing. For example, if the component is not effectively vibrated, this technique may fail to identify flaws in the component.

In an attempt to address this shortcoming, an arrangement utilizing a sonic infrared technique is shown in FIG. 1. A plurality of tape segments or tapes 12, sometimes referred to as foam tape, are applied to a surface of a structure 10, which tapes exhibit measurable thermal increases in response to the structure being vibrated by an ultrasonic horn (not shown). An infrared camera detects thermal energy that is converted into an electric signal which is processed to produce a thermal image, and to perform temperature calculations. Based on the thermal images, it may be possible to verify that the entire structure has been effectively vibrated. However, since the measurable thermal increases only correspond to the localized regions of the structure covered by the tapes, not the entire component, there is currently no mechanism to ensure that the entire component is being effectively vibrated with the ultrasonic horn. Consequently, false negatives may result. Moreover, tapes may be unsuitable for applying to surfaces that are not relatively flat or uniform or continuous, and the tape size may need to be larger than a predetermined minimum size to function properly.

SUMMARY OF THE INVENTION

The disclosure is directed to a structure including a substrate and a coating applied over the substrate, the coating containing particles sized between 30 and 250 micrometers. A proportion of the particles to the carrier is between 40 and 70 by volume percentage. In response to excitation of the structure by a controllable excitation source, a first instrument monitors behavior of the particles to determine a first condition of the structure thereby. In response to an absence of excitation of the structure by the controllable excitation source, a second instrument monitors behavior of the particles to determine a second condition of the structure thereby.

The disclosure is also directed to a structure including a substrate and a coating applied over the substrate, the coating containing particles sized between 30 and 250 micrometers. A proportion of the particles to the carrier is between 40 and 70 by volume percentage. In response to excitation of the structure by a controllable excitation source, a first instrument monitors thermal behavior of the particles to determine a first condition of the structure thereby. In response to an absence of excitation of the structure by the controllable excitation source, a second instrument monitors thermal behavior of the particles to determine a second condition of the structure thereby.

The disclosure is yet further directed to a method of forming a protective barrier including applying a coating to a substrate, the coating containing particles sized between 30 and 250 micrometers in a carrier. The method further provides a proportion of the particles to the carrier is between 40 and 70 by volume percentage. The method further provides observing a thermal increase.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

The coating or measurement coating or layer of the present invention provides benefits, such as permitting monitoring of structures, such as by sonic infrared inspection techniques such as with a controllable excitation source such as an ultrasonic horn, while also permitting confirmation of the reliability of the inspection technique. This reliability confirmation has not been previously achievable with conventional inspection arrangements. As discussed in further detail below, the coating or layer of the present invention may not require a controllable excitation source for use with other nondestructive inspection techniques.

Figure 1:
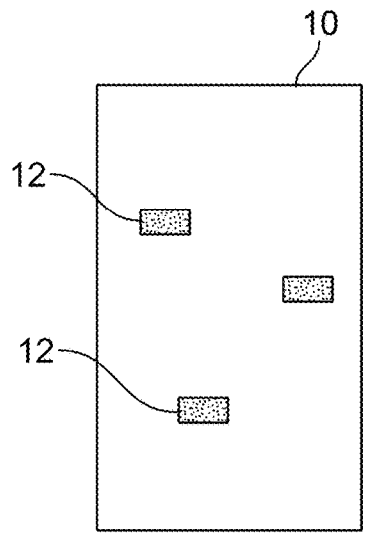
FIG. 1 shows a prior art arrangement of a structure in preparation of conducting sonic infrared testing of the structural component.
Figure 2:
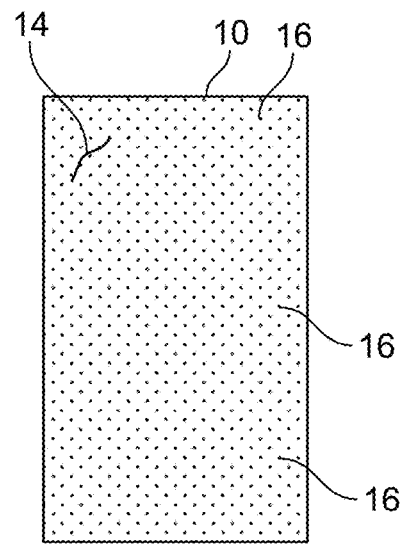
FIG. 2 shows an exemplary embodiment of a coating applied over the structure of FIG. 1.

FIG. 2 shows a novel layer or coating 14 applied over a substrate of structure 10. As shown, particles 16 are dispersed in coating 14. Particles 16 may be comprised of metal shavings or beads, glass microballoons, glass beads, sandblasting media, or other suitable materials. In one embodiment, particles 16 are sized between 30 and 50 micrometers, between 30 and 100 micrometers, between 30 and 250 micrometers, between 50 and 250 micrometers, or any suitable subrange thereof in order to optimize behavior such as the amount of thermal increase generated as a result of excitation of the particles such as by an ultrasonic horn during sonic infrared testing. Particles 16 are distributed in a carrier which permits application of the coating over a substrate of a structure 10. For example, in one embodiment, the coating may be applied by spray painting. In one embodiment, the coating may be applied by brushing. In one embodiment, the coating may be applied by cold spray metal disposition, or other suitable application technique. In one embodiment, a proportion of the particles to the carrier is between 40 and 70 by volume percentage, in order for the particles to be in sufficiently close proximity in order to behave in a manner to optimize a thermal increase as a result of excitation of the particles such as by an ultrasonic horn during sonic infrared testing.

In one embodiment, the surface of the carrier is black or suitably colored to provide an emissivity value greater than 0.9 that effectively emits energy as thermal radiation, which can be monitored by instruments, such as instruments including an infrared camera. In one embodiment, the surface of the carrier may provide an emissivity value of 0.5 or greater. In one embodiment, if a non-radiation-based temperature measurement method is utilized, such as thermocouples, any emissivity value may be used.

There are two categories of use for a structure having the coating of the present invention applied over the substrate of the structure. The first category involves excitation of the structure by a controllable excitation source, such as an ultrasonic horn, a modal hammer, a shaker table, or a shock tester, and monitoring (i.e., measuring and/or detecting) a response or behavior of the particles in the coating to determine a condition of the structure thereby. For example, a condition of the structure includes at least one of the presence, or lack of presence, of vibration, cracks and flaws in the structure. In one embodiment, the response, such as captured thermal images of thermal increase of the particles compared to an expected response (i.e., previously captured thermal images of thermal increase of the particles) forms a basis for evaluating the structure. In one embodiment, the response may be captured thermal images of the particles providing an indication of a standing wave pattern compared to an expected response (i.e., previously captured thermal images of the particles providing an indication of a standing wave pattern) forms a basis for evaluating the structure. In one embodiment, the response is a combination of captured thermal images as a combined indication of thermal increase of the particles as well as the particles indicating a standing wave pattern.

The second category does not involve excitation of the structure by a controllable excitation source. An exemplary application of the second category may include structural health monitoring of a structure in situ, such as a building or a bridge, in which such thermal increases of the particles in the coating may be evidence of the structure being subjected to vibrations, or a lack of vibrations of the structure without external, controllable excitations. In one embodiment, the second category may also be used in modal testing of structures, such as component parts, as a replacement for accelerometers, to determine locations of vibration of the structures without external, controllable excitations. Replacement of accelerometers with the coating of the present invention provides numerous benefits, such as permitting monitoring of an entire surface of a structure, instead of discrete points (similar to limitations associated with use of the tape segments or tape previously discussed). Additionally, replacement of accelerometers reduces mass associated with testing, which may bias the test results. Moreover, the coating can be configured to minimize changes to the local stiffness of the structure, compared to accelerometers.

Figure 3:
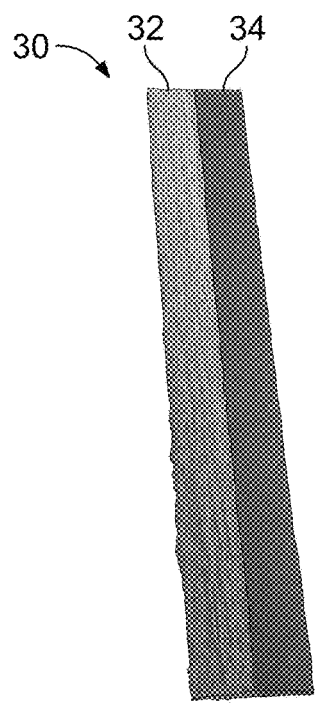
FIG. 3 shows an exemplary embodiment of a coating applied over a structure in preparation of conducting sonic infrared testing of the structure.
Figure 4:
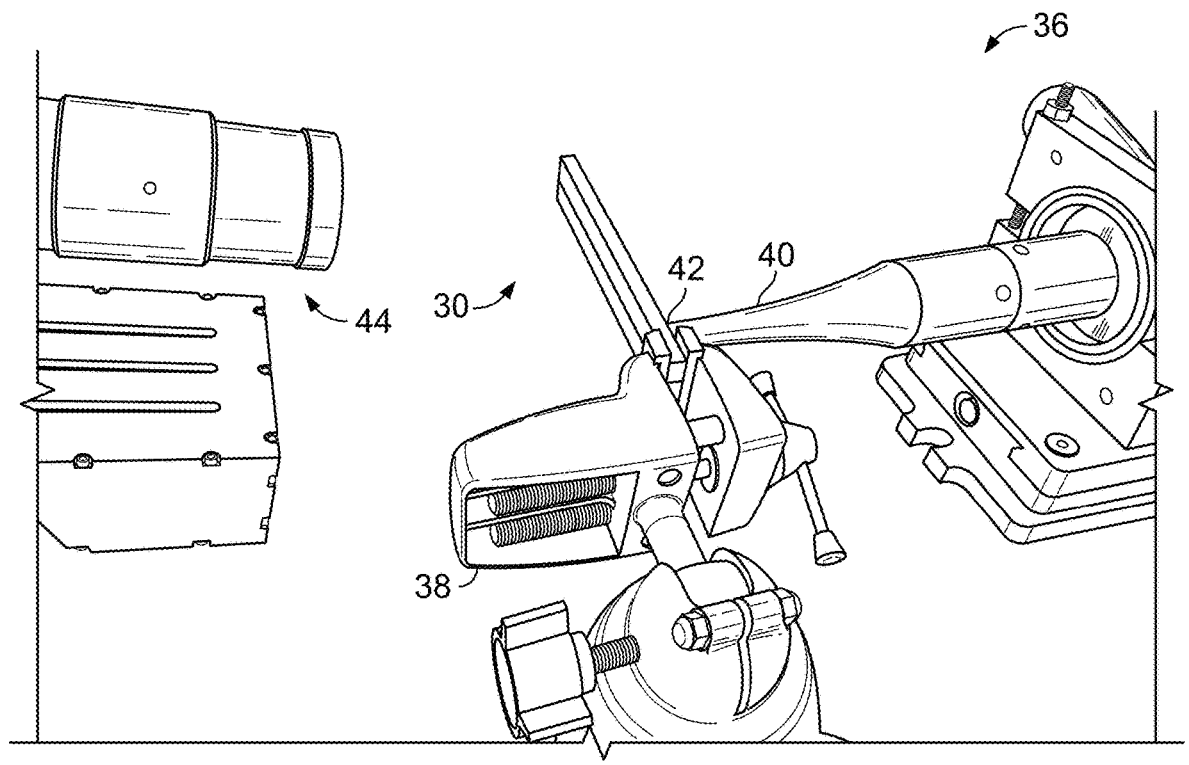
FIG. 4 shows a sonic infrared testing arrangement for testing the structure of FIG. 3.

Referring to FIG. 3, an exemplary embodiment of a coating is now discussed. An elongated generally rectangular specimen 30 includes adjacent portions 32, 34, with each generally equally sized portion extending side-by-side along the longitudinal length of the component. Portion 32 includes a coating composed of a proportion of washable tempura paint to glass microbeads of approximately 5.5 by mass ratio. Portion 34 includes a coating composed of the same paint. FIG. 4 shows a testing arrangement 36 including specimen 30 secured by a clamp 38. A duct tape coupling 42 is interposed between a 900MA "Advanced" model ultrasonic horn 40 manufactured by Branson Ultrasonics Corporation and specimen 30 in order to optimize the vibration interface therebetween. In one embodiment, coupling 42 can composed of metals, card stock, or any suitable material providing contact between the ultrasonic horn and specimen and preventing the ultrasonic horn from damaging (e.g., burning) the surface of the specimen. For purposes of orientation, portion 32 is positioned closer to the surface supporting testing arrangement 36. An infrared camera 44 manufactured by Raytheon is aimed at specimen 30.

Figure 5:
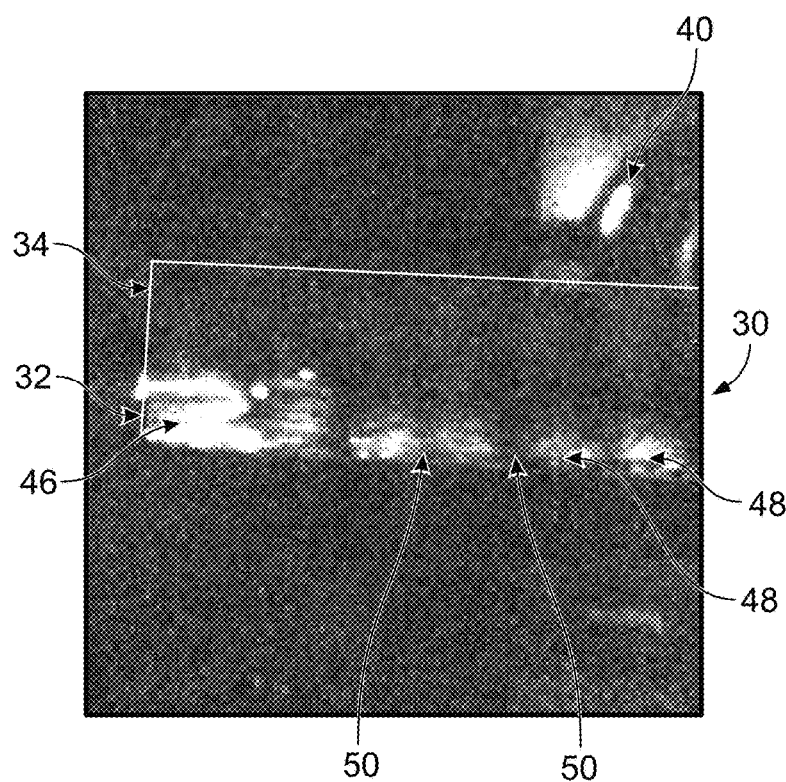
FIGS. 5-8 show images captured during testing of the structure of FIG. 3 with the testing arrangement of FIG. 4.

FIGS. 5-8 show thermal images captured during testing. In FIG. 5, ultrasonic horn 40 is shown, as well as the outline of specimen 30 and portions 32, 34, with portion 34 failing to show regions of thermal increase. However, a significantly heated region 46 corresponds to portion 32. Additionally, portion 32 further shows indications of a standing wave pattern 48, including indications of nodes 50.

In one embodiment, acrylic paint may be used. In one embodiment, polymer paint may be used. In one embodiment, softer binders may be used in the paint, which softer binders are believed to improve the ability of particles to achieve a thermal increase of the particles, as previously discussed. In one embodiment, washable paint may be desirable, such as for purposes of visual appearance. In one embodiment, the coating may be composed of non-paint materials, such as polyurethane and epoxy.

In one embodiment, a method of forming a measurement layer comprises applying a coating to a substrate, the coating containing particles sized between 30 and 250 micrometers in a carrier. The method further provides a proportion of the particles to the carrier is between 40 and 70 by volume percentage, and observing a thermal increase.

Figure 6:
Figure 7:
Figure 8:

FIG. 6 corresponds to an image captured while ultrasonic horn 40 was operated at an increased contact pressure with respect to specimen 30, as compared to the contact pressure corresponding to the captured image of FIG. 5. FIG. 7 corresponds to an image captured while ultrasonic horn 40 was operated at a decreased frequency as compared to the contact pressure corresponding to the captured image of FIG. 5. As a result of FIGS. 5-7 remaining unexpectedly essentially unchanged from each other, changes in contact pressure and operating frequency of the ultrasonic horn, appear to have little effect as to the temperature response of images captured during testing, However, FIG. 8, which corresponds to a change in boundary conditions (i.e., a change in the position of the ultrasonic horn relative to the clamp) resulted in a temperature response change as compared to FIG. 5.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method, comprising:
   applying a coating comprising a carrier and particles to a substrate;
   exciting the substrate by a controllable excitation source;
   wherein the controllable excitation source is one of an ultrasonic horn, a modal hammer, a shaker table, or a shock tester;
   measuring the particles' initial behavior within the coating to determine a first condition of the substrate;
   exciting the substrate at a later-in-time by the controllable excitation source;
   measuring the particles' later-in-time excitation behavior within the coating and determining if there is a behavioral change of the particles from the initial behavior and the later-in-time excitations; and
   determining a second condition of the substrate from the behavioral change to determine cracks or flaws in the substrate.

2. The method of claim 1, wherein the particles are between 30 and 250 micrometers in size.

3. The method of claim 1, wherein the particles to the carrier proportion is between 40 and 70 by volume percentage.

4. The method of claim 1, wherein behavioral change of the particles includes a thermal increase.

5. The method of claim 1, wherein behavior change of the particles provides an indication of a standing wave pattern.

6. The method of claim 5, wherein the controllable excitation source is an ultrasonic horn.

7. The method of claim 6, wherein the indication of a standing wave pattern is unchanged in response to changes in excitation frequency of the ultrasonic horn and in response to changes in contact pressure between the ultrasonic horn and the substrate.

8. The method of claim 1, wherein the particles are comprised of metal, glass, sandblasting media, or a combination thereof.

9. The method of claim 7, wherein behavior of the particles includes a thermal increase.

10. The method of claim 7, wherein behavior of the particles provides an indication of a standing wave pattern.

11. The method of claim 7, wherein the indication of a standing wave pattern is unchanged in response to changes in excitation frequency of the controllable excitation source.

12. The method of claim 1, wherein the coating is applied by spray painting.

13. The method of claim 1, wherein the coating is applied by brushing.

14. The method of claim 1, wherein the coating is applied by cold spray metal deposition.

15. The method of claim 1, wherein the particles' initial and post excitation behaviors are measured by a thermal monitor.

16. The method of claim 1, wherein the second condition comprises at least one of a presence of vibration, cracks and flaws.

17. The method of claim 1, wherein the coating is composed of a proportion of washable tempura paint to glass microbeads of approximately 5.5 by mass ratio.

18. The method of claim 1, wherein the carrier is an acrylic paint or a polymer paint.

19. The method of claim 1, wherein the carrier is a polyurethane.

20. The method of claim 1, wherein the carrier is an epoxy.

21. A method, comprising:
    applying a coating comprising a carrier and particles to a substrate;
    measuring the particles' initial behavior within the coating to determine a first condition of the substrate;
    measuring the particles' later-in-time behavior within the coating and determining if there is a behavioral change of the particles resulting from a mechanical excitation by a mechanical excitation source;
    wherein the mechanical excitation source is one of an ultrasonic horn, a modal hammer, a shaker table, a shock tester or a vibrational; and
    determining a second condition of the substrate behavioral change by comparing the first and second conditions to determine cracks or flaws in the substrate.

22. The method of claim 21, wherein the particles are between 30 and 250 micrometers in size.

23. The method of claim 21, wherein the particles to the carrier proportion is between 40 and 70 by volume percentage.

24. The method of claim 21, wherein the behavioral change is induced by an excitation of the substrate.

25. The method of claim 21, wherein behavioral change of the particles includes a thermal increase.

26. The method of claim 21, wherein behavior change of the particles provides an indication of a standing wave pattern.

27. The method of claim 21, wherein the excitation of the substrate is from vibration of the substrate.

28. The method of claim 21, wherein the particles are comprised of metal, glass, sandblasting media, or a combination thereof.

29. The method of claim 21, wherein behavior of the particles includes a thermal increase.

30. The method of claim 21, wherein the coating is applied by spray painting.

31. The method of claim 21, wherein the coating is applied by brushing.

32. The method of claim 21, wherein the coating is applied by cold spray metal deposition.

33. The method of claim 21, wherein the particles' initial and later-in-time behaviors are measured by a thermal monitor.

34. The method of claim 21, wherein the second condition comprises at least one of a presence of vibration, cracks and flaws.

35. The method of claim 21, wherein the coating is composed of a proportion of washable tempura paint to glass microbeads of approximately 5.5 by mass ratio.

36. The method of claim 21, wherein the carrier is an acrylic paint or a polymer paint.

37. The method of claim 21, wherein the carrier is a polyurethane.

38. The method of claim 21, wherein the carrier is an epoxy.

* * * * *